United States Patent
Hill

(10) Patent No.: US 11,230,980 B2
(45) Date of Patent: Jan. 25, 2022

(54) FAULT-ACCOMMODATING FLOW SCHEDULING VALVE

(71) Applicant: ROLLS-ROYCE plc, London (GB)

(72) Inventor: Ralph W. Hill, Matlock (GB)

(73) Assignee: ROLLS-ROYCE plc, London (GB)

( * ) Notice: Subject to any disclaimer, the term of this patent is extended or adjusted under 35 U.S.C. 154(b) by 357 days.

(21) Appl. No.: 16/265,022

(22) Filed: Feb. 1, 2019

(65) Prior Publication Data
US 2019/0285004 A1    Sep. 19, 2019

(30) Foreign Application Priority Data

Mar. 16, 2018    (GB) .................................. 1804284.6

(51) Int. Cl.
*F02C 7/232*    (2006.01)
*F02C 9/46*    (2006.01)
(Continued)

(52) U.S. Cl.
CPC ................ *F02C 9/46* (2013.01); *F01D 25/18* (2013.01); *F02C 7/06* (2013.01); *F02C 7/222* (2013.01); *F02C 7/228* (2013.01); *F02C 7/232* (2013.01); *F16K 11/044* (2013.01); *F16K 11/105* (2013.01); *F16K 17/044* (2013.01); *F16K 17/048* (2013.01); *F16K 17/0473* (2013.01);
(Continued)

(58) Field of Classification Search
CPC ............. F02C 7/232; Y10T 137/87877; F16K 11/105; F16K 17/044; F16K 17/0473; F16K 17/048; F16K 17/406
See application file for complete search history.

(56) References Cited

U.S. PATENT DOCUMENTS 2,327,942 A * 8/1943 Thoresen ............ F16K 17/0473
137/115.14
3,779,280 A * 12/1973 Evans ................... F16K 11/048
137/625.5
(Continued)

FOREIGN PATENT DOCUMENTS

EP    1653132 A1 *  5/2006 ............ F16K 11/048
EP    2339147 A2    6/2011
(Continued)

*Primary Examiner* — Todd E Manahan
*Assistant Examiner* — Marc J Amar
(74) *Attorney, Agent, or Firm* — Oliff PLC

(57) ABSTRACT

A fault-accommodating flow scheduling valve has a first inlet, outlet, and orifice therebetween. The valve has a shuttle valve member on the orifice inlet side, a primary valve member on the orifice outlet side, a compression-loaded primary spring, and first and second compression-loaded balance springs. Below a threshold differential pressure, the primary valve member engages with the outlet-side sealing face to close the valve while the shuttle valve member is spaced from the inlet-side sealing face, and on failure of the primary spring, the primary valve member moves from the outlet-side sealing face but the shuttle valve member closes the valve. Above the threshold differential pressure, the primary valve member opens the valve while the shuttle valve member remains spaced, and on failure of the primary spring, the primary valve member moves further from the outlet-side sealing face but the shuttle valve member closes the valve.

18 Claims, 10 Drawing Sheets

(51) Int. Cl.
  *F02C 7/228* (2006.01)
  *F16K 17/40* (2006.01)
  *F16K 17/04* (2006.01)
  *F16K 11/044* (2006.01)
  *F02C 7/22* (2006.01)
  *F16K 11/10* (2006.01)
  *F01D 25/18* (2006.01)
  *F02C 7/06* (2006.01)

(52) U.S. Cl.
  CPC ..... *F16K 17/406* (2013.01); *Y10T 137/87877* (2015.04)

(56) References Cited

U.S. PATENT DOCUMENTS

| | | | |
|---|---|---|---|
| 6,058,694 A * | 5/2000 | Ackerman | F01D 25/18 |
| | | | 184/6.11 |
| 6,748,965 B2 * | 6/2004 | Lee | F16K 11/105 |
| | | | 137/118.01 |
| 8,499,542 B2 | 8/2013 | Zebrowski | |
| 2013/0043331 A1 | 2/2013 | Snodgrass et al. | |
| 2013/0055719 A1 * | 3/2013 | Ogata | F23K 5/06 |
| | | | 60/740 |
| 2013/0259088 A1 | 10/2013 | Bellis et al. | |

FOREIGN PATENT DOCUMENTS

| | | | | |
|---|---|---|---|---|
| EP | 3070408 A1 | | 9/2016 | |
| EP | 3217000 A1 | | 9/2017 | |
| GB | 2042129 A | * | 9/1980 | ............ F16K 11/044 |

* cited by examiner

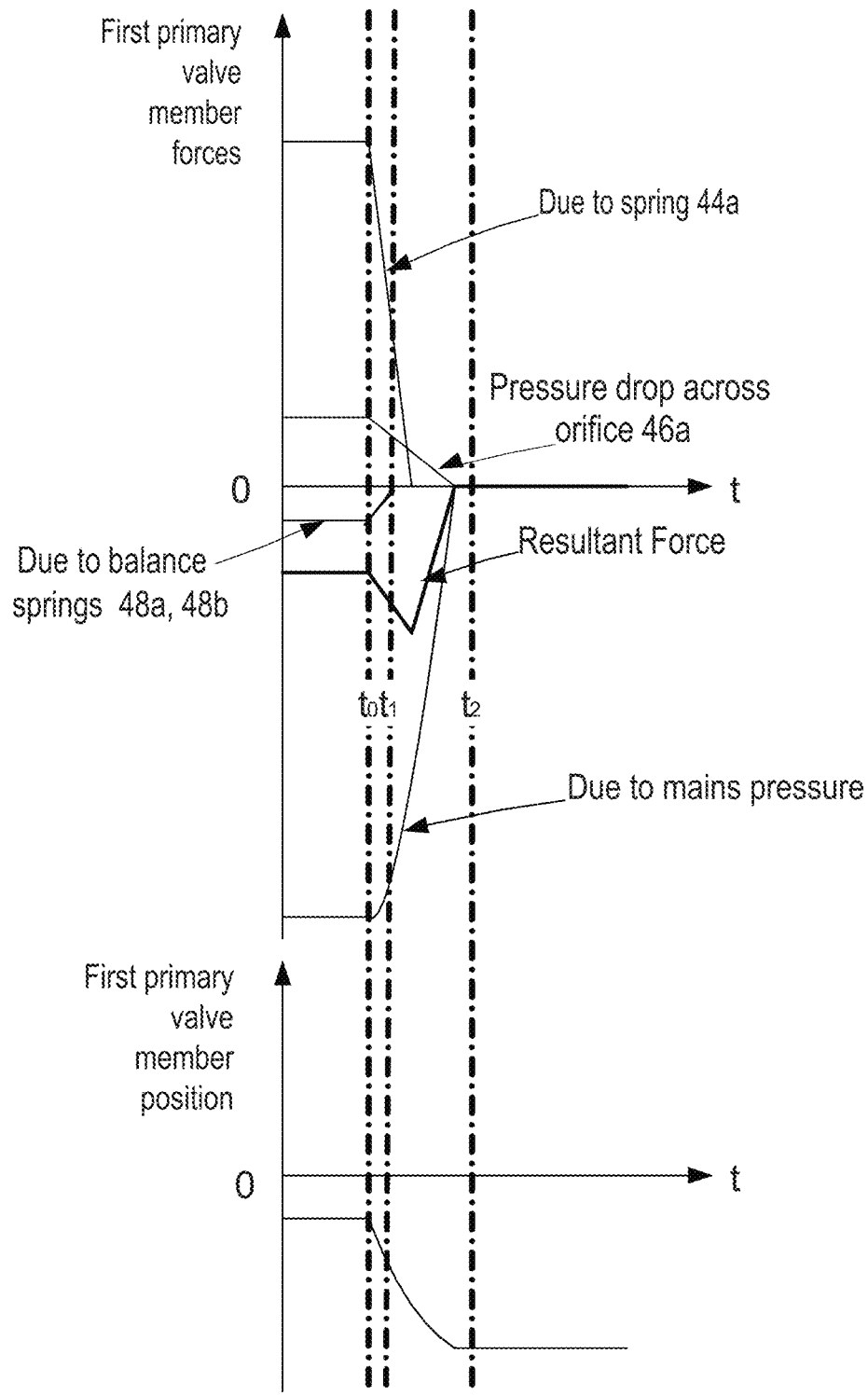

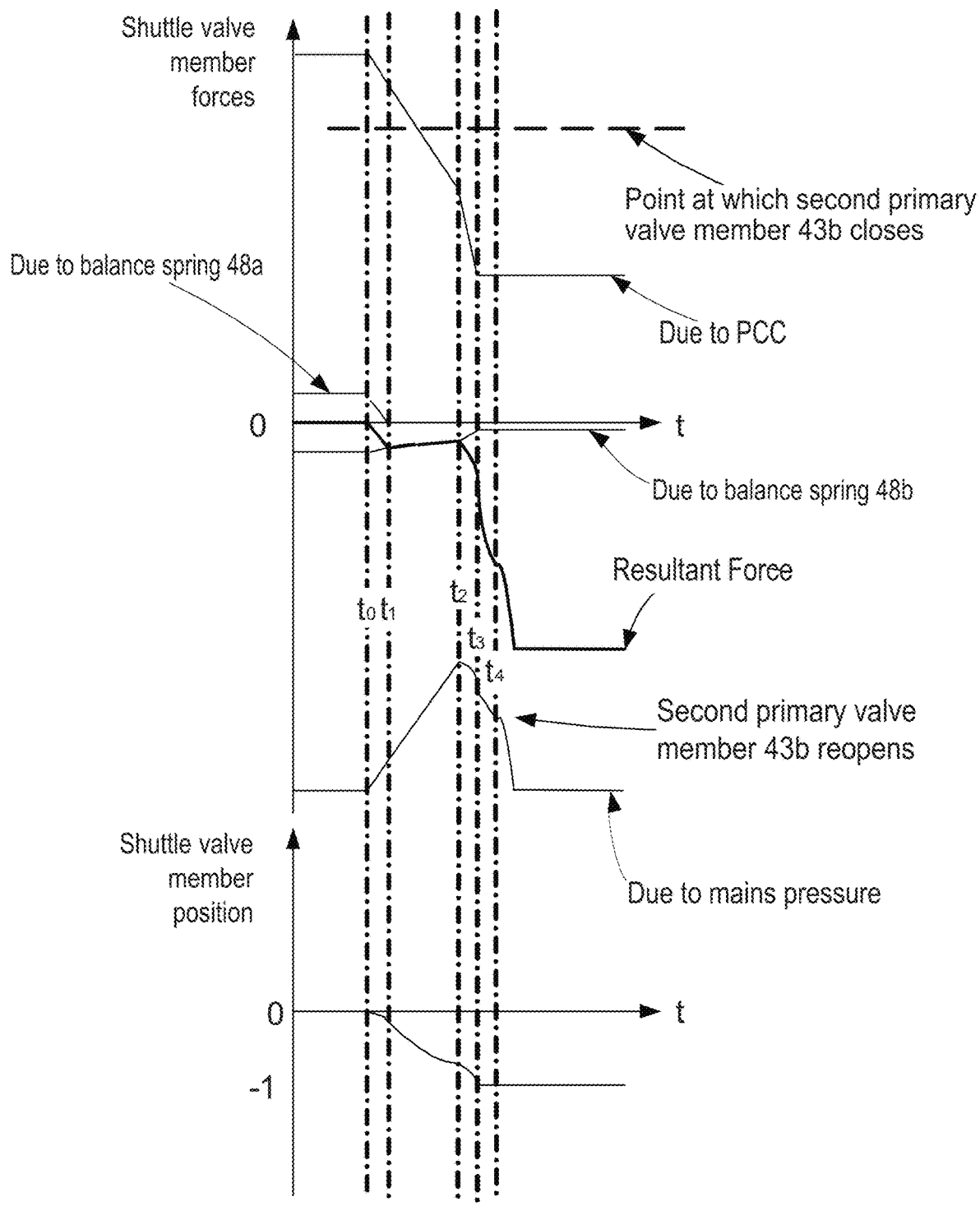

FAULT-ACCOMMODATING FLOW SCHEDULING VALVE

FIELD OF THE PRESENT DISCLOSURE

The present disclosure relates to a fault-accommodating flow scheduling valve.

BACKGROUND

Multi-stage combustors are used particularly in lean burn fuel systems of gas turbine engines to reduce unwanted emissions while maintaining thermal efficiency and flame stability. For example, duplex fuel burners have pilot and mains fuel manifolds feeding pilot and mains discharge orifices of the burners. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging.

A typical annular combustor has a circumferential arrangement of fuel burners, each associated with respective pilot and mains feeds extending from the circumferentially extending pilot and mains manifolds. Each burner generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the burners, a check valve, known as a flow scheduling valve (FSV), is typically associated with each feed. The FSVs prevent fuel flow into the burner nozzle when the differential between the supply pressure and the combustion chamber pressure is less than a cracking pressure.

Multi-stage combustors may have further stages and/or manifolds. For example, the pilot manifold may be split into two manifolds for lean blow-out prevention.

During pilot-only operation, the splitter valve directs fuel for burning flows only through the pilot fuel circuit (i.e. pilot manifold and feeds). It is therefore conventional to control temperatures in the stagnant (i.e. mains) fuel circuit to prevent coking due to heat pick up from the hot engine casing. One known approach, for example, is to provide a separate recirculation or cooling supply manifold which is used to keep the fuel in the mains manifold cool when it is deselected. It does this by keeping the fuel in the mains manifold moving, although a cooling flow also has to be maintained in the recirculation manifold during mains operation to avoid coking. An example of a staging system having such a recirculation manifold is disclosed in EP A 3217000.

However, a problem associated with staged combustion is how to accommodate a mains FSV failing to an open condition. In pilot-only operation, when cooling flow is passing through the mains manifold, such a failure can cause hot streaks which may lead to nozzle and turbine damage. In pilot and mains operation, such a failure can produce a drop in mains manifold pressure which causes other mains FSVs to close. A possible outcome is again hot streaks leading to nozzle and turbine damage.

One approach proposed in EPA 3217000 is to utilise measurements of pressure variation within the recirculation flow and engine response to provide rapid detection of failure. Another approach proposed in US 2013/0259088 is to makes thermocouple measurements that can distinguish hot streaks. However, in both these approaches, the accommodation of mains FSV failure takes the form of engine shut down or switching off the mains supply to the engine with associated reduction of engine thrust.

SUMMARY

Accordingly, in a first aspect, the present disclosure provides a fault-accommodating flow scheduling valve having:
  a first inlet for flow of fluid into the valve, an outlet for flow of fluid out of the valve, and an orifice therebetween;
  a shuttle valve member on the inlet-side of the orifice and configured to seal the outlet from the first inlet when the shuttle valve member engages with an inlet-side sealing face of the orifice;
  a primary valve member on the outlet-side of the orifice and configured to seal the outlet from the first inlet when the primary valve member engages with an outlet-side sealing face of the orifice;
  a compression-loaded primary spring which acts on the primary valve member to urge the primary valve member into engagement with the outlet-side sealing face;
  first and second compression-loaded balance springs which act on the shuttle valve member, the first balance spring acting between a first side of the shuttle valve member and the primary valve member, and the second balance spring acting on an opposite, second side of shuttle valve member;
  wherein the primary and balance springs are configured such that, below a threshold differential pressure across the primary valve member: (i) in normal operation of the flow scheduling valve, the primary valve member engages with the outlet-side sealing face to close the valve while the shuttle valve member is spaced from the inlet-side sealing face, and (ii) on failure of the primary spring, the primary valve member moves away from the outlet-side sealing face but the shuttle valve member engages with the inlet-side sealing face to close the valve; and
  wherein the primary and balance springs are further configured such that, above the threshold differential pressure across the primary valve member: (i) in normal operation of the flow scheduling valve, the primary valve member moves away from the outlet-side sealing face to open the valve while the shuttle valve member remains spaced from the inlet-side sealing face, and (ii) on failure of the primary spring, the primary valve member moves further away from the outlet-side sealing face but the shuttle valve member engages with the inlet-side sealing face to close the valve.

Advantageously, the valve can accommodate not only failure of the primary spring (and thus, in the context of gas turbine staged combustion, can help to prevent hot streaks which may lead to nozzle and turbine damage), but can also accommodate a range of blockage conditions. Further, the accommodation provided by the valve is automatic, and does not rely on other measurements, which may themselves be subject to error.

The valve may have any one or, to the extent that they are compatible, any combination of the following optional features.

The springs may be helically coiled springs.

The first balance spring may extend through the orifice to act between the first side of the shuttle valve member and the primary valve member.

In general, each balance spring acts at opposite ends thereof on respective points of reaction. However, either or both of the ends of each balance spring may be operably detachable from their respective points of reaction if the compression loading of that balance spring is removed. In this way it is possibly to prevent loading of the balance spring in tension. The, or each, point of reaction from which that balance spring end is operably detachable may have an associated retaining structure (e.g. a recess or projection) along which the detached end is slidably movable if the compression loading of that balance spring is removed, thereby maintaining alignment of the detached end and its point of reaction.

In general, the shuttle valve member has a sealing surface which engages with the inlet-side sealing face, and the primary valve member has a sealing surface which engages with the outlet-side sealing face. The distance between the sealing surfaces of the shuttle valve member and the primary valve member when the first balance spring is fully compressed may be greater than the distance between the outlet-side sealing face and the inlet-side sealing face. This can then ensure that the first balance spring determines the closest possible approach of the shuttle valve member and the primary valve member.

The first inlet may be positioned such that the flow of fluid into the valve impinges on an impingement portion of the shuttle valve member when it engages with the inlet-side sealing face of the orifice on failure of the primary spring, the impingement portion being shaped such that the impingement of the flow thereon provides an assistive force maintaining engagement of the shuttle valve member with the inlet-side sealing face.

Conveniently, the valve may be a dual valve having first and second of the outlets, first and second of the orifices, first and second of the primary valve members, and first and second of the primary springs respectively acting on the first and second primary valve members, wherein: the first orifice is between the first inlet and the first outlet, the first primary valve member being on the first outlet-side of the first orifice; the second orifice is between the first inlet and the second outlet, the second primary valve member being on the second outlet-side of the second orifice; the shuttle valve member is located between the first and second orifices; and the first balance spring acts between the first side of the shuttle valve member and the first primary valve member, and the second balance spring acts between the second side of the shuttle valve member and the second primary valve member. Such a valve enables a symmetrical configuration in which, in normal operation, the forces acting on both sides of the shuttle valve member can be equalised while maintaining the shuttle valve member at a single central location. Thus in normal operation of the dual valve, and for pressures across the primary valve members both below and above the threshold differential pressure, the balance springs may maintain the shuttle valve member midway between the orifices.

In the context of the dual valve, the first inlet may be a split inlet providing a first entry position for a first portion of the flow of fluid into the valve and a second entry position for a second portion of the flow of fluid into the valve, the first entry position being positioned such that the first portion of flow impinges on a first impingement portion of the shuttle valve member when it engages with the inlet-side sealing face of the first orifice on failure of the first primary spring, and the second entry position being positioned such that the second portion of flow impinges on a second impingement portion of the shuttle valve member when it engages with the inlet-side sealing face of the second orifice on failure of the second primary spring, each impingement portion being shaped such that the impingement of the respective flow portion thereon provides an assistive force maintaining engagement of the shuttle valve member with the respective inlet-side sealing face.

As an alternative to the dual valve (i.e. typically in the context of a single valve), the second balance spring may act between a fixed anchor point (e.g. a wall of the valve) and the second side of shuttle valve member. In this case, for normal operation and for pressures across the primary valve member both below and above the threshold differential pressure, the balance springs may maintain the shuttle valve member at distances from the inlet-side sealing face such that the shuttle valve member does not restrict fluid flow through the orifice.

The valve may further have a second inlet for flow of fluid into the valve, the second inlet being on the same side of the, or each, orifice as the first inlet, whereby: when the differential pressure across the, or each, primary valve member is above the threshold differential pressure such that the valve is open, the flow of fluid into the valve is through the first inlet and optionally the second inlet; and when the differential pressure across the, or each, primary valve member is below the threshold differential pressure such that the valve is closed, a circulating flow of fluid enters the valve through the second inlet and leaves the valve through the first inlet. Thus typically the second inlet can be for supply of a cooling flow. In general, optional features of the first inlet discussed above pertain also to the second inlet. For example, the second inlet may be positioned such that the flow of fluid into the valve through the second inlet impinges on a respective impingement portion of the shuttle valve member. As another example, the second inlet may be a split inlet.

Alternatively, the valve may further have a bypass outlet for flow of fluid from the valve, the bypass outlet being on the same side of the, or each, orifice as the first inlet.

The valve may further have a bypass mechanism allowing a residual flow of fluid to bypass the shuttle valve member when the shuttle valve member engages with the inlet-side sealing face to close the valve. Thus in this case, the closed state of the valve is associated with a residual flow through the bypass mechanism.

In a second aspect, the present disclosure provides a fuel supply system of a gas turbine engine having a fuel supply manifold, plural burners of a combustor of the engine, and plural fault-accommodating flow scheduling valves according to the first aspect, the fuel supply manifold supplying fuel to the first inlets of the flow scheduling valves, and the outlets of the flow scheduling valves supplying fuel to the burners, wherein the flow scheduling valves control fuel flow from the manifold to the burners.

The fuel supply system may have any one or, to the extent that they are compatible, any combination of the following optional features.

The fuel supply manifold may be a mains fuel supply manifold which supplies a mains fuel flow to the burners, the fuel supply system may further have a pilot fuel supply manifold which supplies a pilot fuel flow to the burners, the fuel supply system may have a pilot-only operation mode in which just the pilot fuel flow is supplied to the burners, and the fuel supply system may have a pilot and mains operation mode in which both the pilot fuel flow and the mains fuel flow are supplied to the burners. In this case, in the pilot-only operation mode, the pressure in the mains fuel supply manifold may cause the differential pressure across the primary valve members to be below the threshold differential pressure to close the valves, and, in the pilot and mains operation mode, the pressure in the mains fuel supply manifold may cause the differential pressure across the primary valve members to be above the threshold differential pressure to open the valves.

When each fault-accommodating flow scheduling valve has a second inlet for flow of fluid into the valve on the same side of the, or each, orifice as the first inlet, the fuel supply system may further have a cooling supply manifold which supplies a cooling fuel flow to the second inlets of the flow scheduling valves during pilot-only operation, whereby: when the differential pressure across each primary valve member is above the threshold differential pressure such that the valve is open, the flow of fluid into the valve is through the first inlet from the mains fuel supply manifold and optionally through the second inlet from the cooling supply manifold; and when the differential pressure across the, or each, primary valve member is below the threshold differential pressure such that the valve is closed, a circulating flow of fluid enters the valve through the second inlet from the cooling supply manifold and leaves the valve through the first inlet to the mains fuel supply manifold, or vice versa.

Alternatively, when each fault-accommodating flow scheduling valve has a bypass outlet for flow of fluid from the valve on the same side of the, or each, orifice as the first inlet, the fuel supply manifold may be a single fuel supply manifold which supplies a metered fuel flow to the burners, the fuel supply system may have a pilot-only operation mode in which just a pilot fuel flow is supplied to the burners, and the fuel supply system may have a pilot and mains operation mode in which both the pilot fuel flow and a mains fuel flow are supplied to the burners. In this case, in both operation modes, the pilot fuel flow is provided through the bypass outlets; in the pilot-only operation mode, the pressure in the single fuel supply manifold may cause the differential pressure across the primary valve members to be below the threshold differential pressure to close the valves; and, in the pilot and mains operation mode, the pressure in the mains fuel supply manifold may cause the differential pressure across the primary valve members to be above the threshold differential pressure to open the valves.

In a third aspect, the present disclosure provides a gas turbine engine having the fuel supply system of the second aspect.

In a fourth aspect, the present disclosure provides an oil supply system of a power gearbox having an oil supply line and a fault-accommodating flow scheduling valve according to the first aspect, the oil supply line supplying oil to the first inlet of the flow scheduling valve, and the outlet of the flow scheduling valve supplying oil to the power gearbox, wherein the flow scheduling valve controls oil flow from the oil supply line to the power gearbox.

In a fifth aspect, the present disclosure provides a power gearbox having the oil supply system of the fourth aspect.

BRIEF DESCRIPTION OF THE DRAWINGS

Embodiments of the present disclosure will now be described by way of example with reference to the accompanying drawings in which:

FIGS. 8A-8D show corresponding timeline graphs for respectively first primary valve member forces, shuttle valve member forces, first primary valve member position, and shuttle valve member position;

DETAILED DESCRIPTION AND FURTHER OPTIONAL FEATURES

Figure 1:
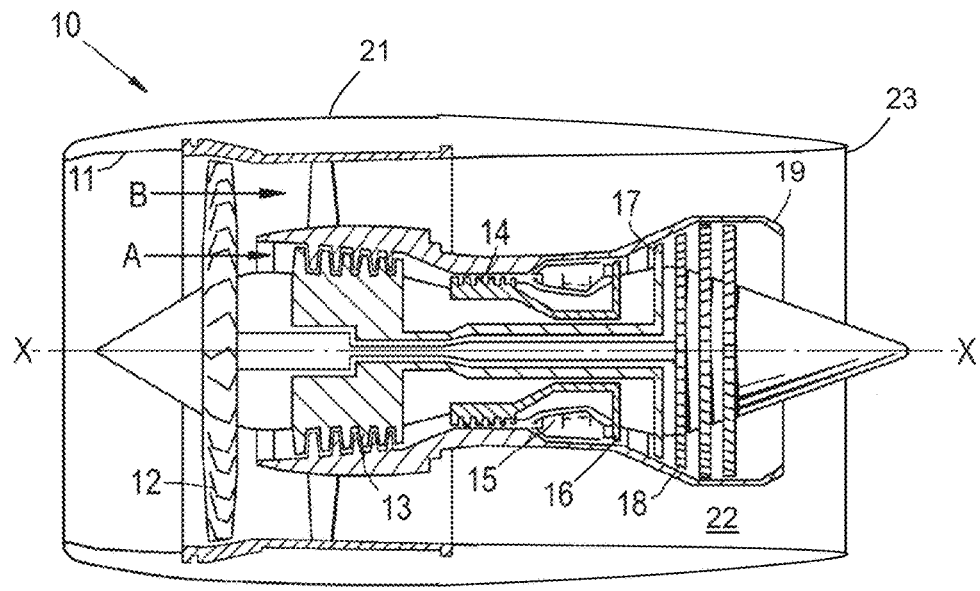
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox, for example a power gearbox, provided in the drive train from a turbine to a compressor and/or fan.

Figure 2:
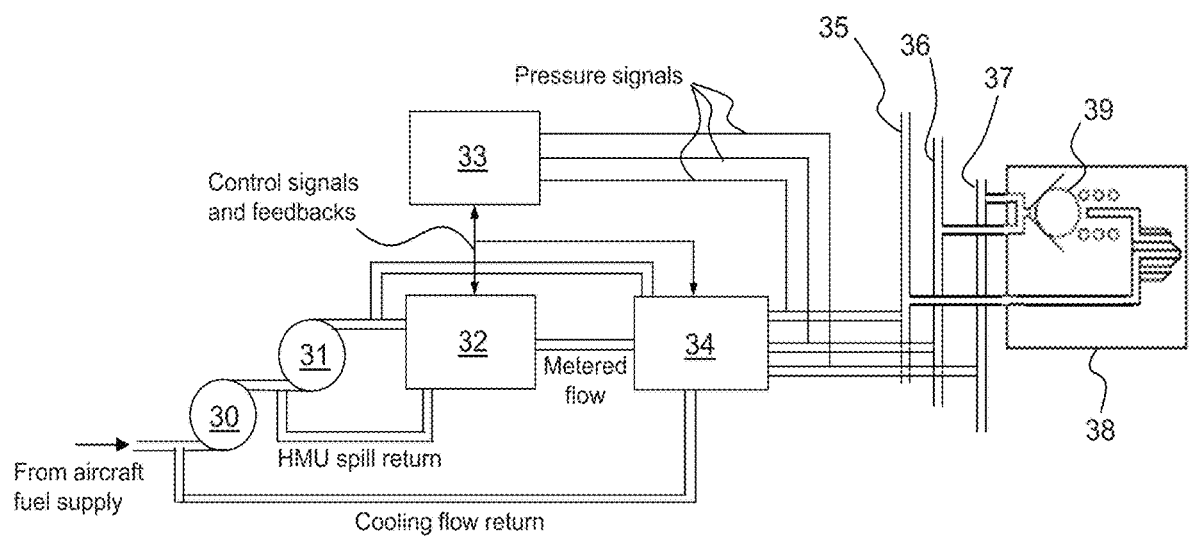
FIG. 2 shows schematically a staged combustion fuel supply system of the engine of FIG. 1.

FIG. 2 shows schematically a staged combustion fuel supply system of the engine 10. A pumping unit comprising a low pressure (LP) pumping stage 30 draws fuel from a fuel tank of the aircraft and supplies the fuel at boosted pressure to the inlet of a high pressure (HP) pumping stage 31. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

A hydro-mechanical unit (HMU) 32 comprising a fuel metering valve receives the boosted pressure fuel from HP pumping stage 31, and is operable under the command of an engine electronic controller (EEC) 33 to control the rate at which fuel is allowed to flow to the combustor 15. The HMU typically comprises: a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such as variable inlet guide vane or variable stator vane actuators) that receive fuel under pressure from the HMU. Further details of such an HMU are described in EP 2339147 A.

The metered fuel flow leaves the HMU and arrives at a staging system 34 which splits the fuel under the control of the EEC into several flows serving a pilot manifold 35, a mains manifold 36 and a cooling supply manifold 37. The pilot manifold feeds pilot nozzles of fuel burners 38 (only one shown in FIG. 2) of the combustor, while the mains manifold feeds secondary nozzles of the fuel burners. Mains FSVs 39 at the heads of the burners prevent fuel flow from the mains manifold into the secondary burner nozzles when the pressure differential across the FSVs is less than a cracking pressure (threshold differential pressure). By varying the fuel split between the manifolds, the EEC can thus perform staging control of the engine. The cooling supply manifold 37 provides the mains manifold 36 with a cooling flow of fuel when mains manifold is deselected. In particular, the cooling supply manifold has feeds which introduce the cooling flow to the mains manifold at the mains FSVs 39.

Figure 3:
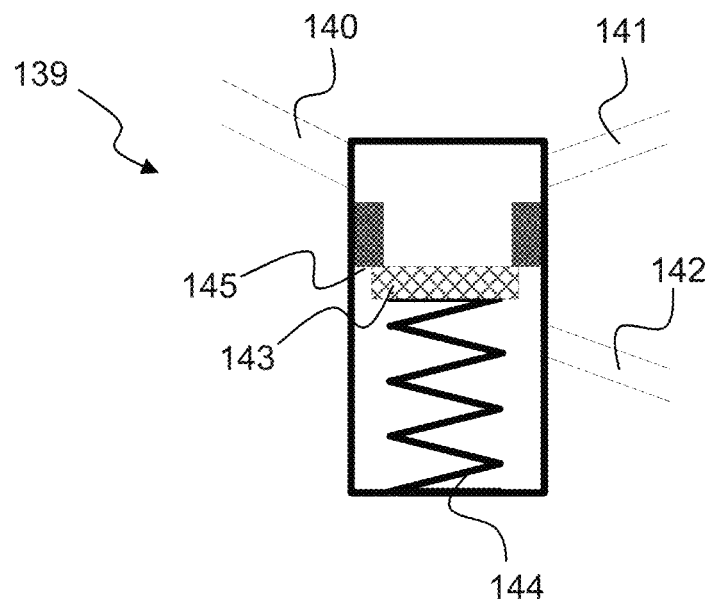
FIG. 3 shows schematically a conventional form of mains flow scheduling valve (FSV)

Before considering in more detail features of the mains FSVs 39, it is helpful to review the operation of a conventional form of mains FSV 139, shown schematically in FIG. 3. The conventional mains FSV has a mains inlet 140 for supply of fuel from the mains manifold, a cooling inlet 141 for supply of fuel from the cooling flow manifold, and an outlet 142 for onward supply of fuel to a stem of the respective burner and ultimately its secondary nozzle. The mains FSV also has a slidably movable valve member 143, and a compression-loaded spring 144 which acts on the valve member to urge it into engagement with a sealing face 145. The mains inlet and cooling inlet are on one side of the sealing face and the outlet is on the other side of the sealing face, such that the inlets can be isolated from or opened to the outlet depending on the position of the valve member.

During normal operation when mains is de-selected, the conventional mains FSV 139 prevents fuel flow into the burner, and in this case the pressure in the mains manifold is managed to be greater than the combustion chamber pressure (PCC), but less than the sum of PCC and the cracking pressure (PFSVCP) needed to open the FSV. The pressure is managed by control of the cooling flow through the cooling supply and mains manifolds. However, if the FSV fails in an open condition when mains is de-selected, then the additional flow into the engine could lead to a hot streak hazardous condition.

During normal operation with mains selected, the staging system changes from a state in which all metered flow is to the pilot manifold (plus scheduling of a cooling flow through the cooling supply manifold) to a state in which there is a managed split of flows to the pilot and mains manifolds and the cooling manifold is closed off (with the exception of a leakage flow from the metered fuel supply for thermal management). The flow from the staging system is at a pressure greater than PCC+PFSVCP, causing the conventional mains FSV 139 to open. The amount of opening is dependent upon the quantity of flow passing through the mains manifold against FSV spring pressures, which are effectively balanced around the manifold by hydraulic (fueldraulic) action.

If a mains FSV 139 fails in an open condition with mains selected, then the force (i.e. back pressure) from the FSV spring 144 is removed such that that the flow through the respective burner is limited only by the flow capacity of the burner. This then acts as a preferential burner allowing increased flow through the burner and causing a pressure drop in the mains manifold. If the engine is at altitude, the pressure drop can cause one or more other mains FSVs to close, as the pressure of fuel may not be maintained at greater than PCC+PFSVCP for all the mains FSVs. If the engine is on the ground, the pressure drop can simply cause the other mains FSVs to partially close.

Figure 4:
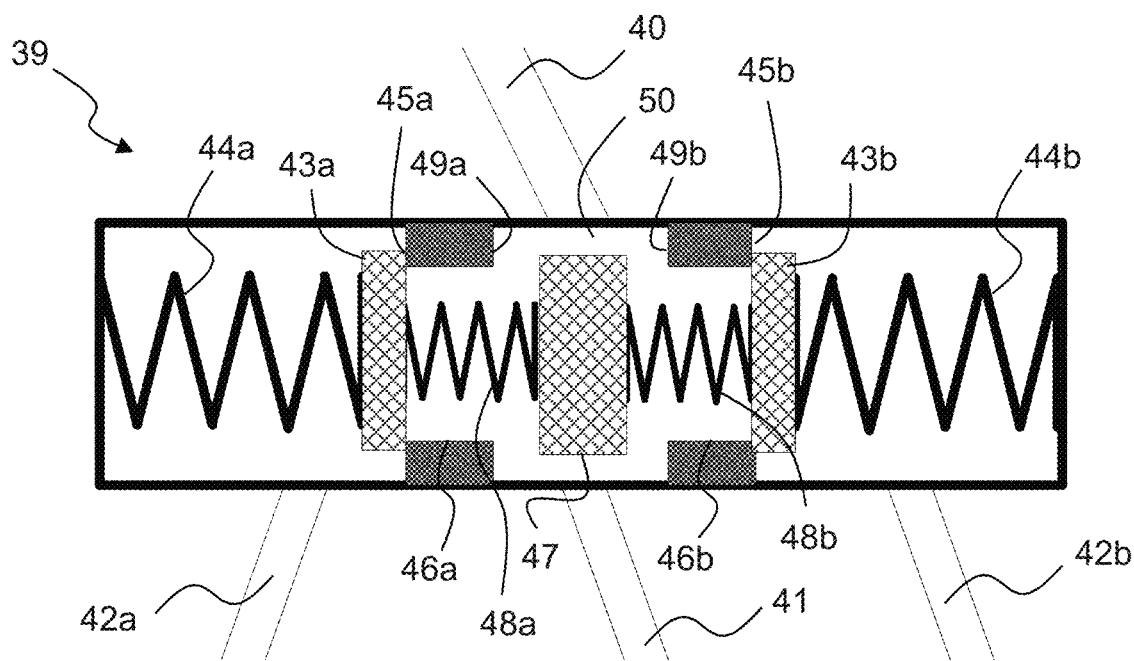
FIG. 4 shows schematically a mains dual FSV of the staging system of FIG. 2.

FIG. 4 then shows schematically a mains FSV 39 of the staging system 34 of FIG. 2. The mains FSVs are configured to use the reduction in pressure in the mains manifold 36 and the closure response of a healthy FSV to provide faultaccommodation of a failed mains FSV. In particular, the mains FSVs can ensure that fuel flow through a failed FSV is prevented. The fuel thus continues being distributed to the other burners such that, instead of over-fueling through the failed burner 38, which could lead to a hot streak, the failed burner mains flow is closed off producing a cool streak in the combustion pattern. This cool streak and the associated combined rise around the remaining burner circumference does not cause a hazardous scenario. Although the following description of the operation of the mains FSVs relates to a dual-manifold pilot and mains staging architecture, a single-manifold staging architecture can also make use of such an FSV.

The mains FSV 39 is a linearly opposed dual valve that conveniently supplies fuel to two adjacent burners 38. It has a shuttle valve chamber 50 into which feed a mains inlet 40 for supply of fuel from the mains manifold 36 and a cooling inlet 41 for supply of fuel from the cooling flow manifold 37. It also has a first outlet 42a for onward supply of fuel to a stem of one of the burners, and a second outlet 42b for onward supply of fuel to a stem of the other burner. A first orifice 46a is located between the shuttle valve chamber (and hence the mains and cooling inlets) and the first outlet. Similarly, a second orifice 46b is located between the shuttle valve chamber and the second outlet.

The mains FSV 39 also has a slidably movable first primary valve member 43a, and a first compression-loaded primary spring 44a which acts on the first primary valve member to urge it into engagement with an outlet-side sealing face 45a of the first orifice 46a. Similarly, it has a slidably movable second primary valve member 43b, and a second compression-loaded primary spring 44b which acts on the second primary valve member to urge it into engagement with an outlet-side sealing face 45b of the second orifice 46b.

The mains FSV 39 further has a slidably movable shuttle valve member 47 located in the shuttle valve chamber 50.

The shuttle valve member is configured to seal the first outlet 42a from the mains 40 and cooling 41 inlets when the shuttle valve member engages with an inlet-side sealing face 49a of the first orifice, and is further configured to seal the second outlet 42b from the mains 40 and cooling 41 inlets when the shuttle valve member engages with an inlet-side sealing face 49b of the second orifice. First 48a and second 48b compression-loaded balance springs act on the shuttle valve member. In particular, the first balance spring acts between a first side of the shuttle valve member and the first primary valve member 43a, and the second balance spring acts between an opposite, second side of the shuttle valve member and the second primary valve member 43b. In this way, the shuttle valve member is nominally centrally positioned in the shuttle valve chamber by the balance springs. FIG. 4 illustrates the state of the FSV and primary and balance springs when mains is de-selected and there is a cooling flow through cooling supply manifold 37, into the shuttle valve chamber 50 and thence through the mains manifold 36.

The shuttle valve member 47 is centrally located in the shuttle valve chamber 50, and typically the balance springs 48a, 48b are equivalent in terms of installed force and length. Inevitable variation in the characteristics associated with the balance springs can be accommodated such that the shuttle valve member does not act as a restriction, in normal operation, to fuel pressures that are applied on the primary valve members 43a, 43b, or on flows through the orifices 46a, 46b. This accommodation can be achieved by allowing a range of movement within the shuttle valve chamber to accommodate the range of variation in balance springs.

FIGS. 5A-5D show the sequence of failure accommodation by the mains FSV 39 when mains is de-selected and there is a failure in the first primary spring 44a. FIGS. 6A-6D show corresponding timeline graphs for respectively: first primary valve member forces (positive forces directed to the right in FIGS. 5A-5D), shuttle valve member forces (positive forces directed to the right in FIGS. 5A-5D), first primary valve member position (positive positions to the right in FIGS. 5A-5D, with zero being the first primary valve member closed to the outlet-side sealing face 45a), and shuttle valve member position (positive positions to the right in FIGS. 5A-5D, with zero being the central location and −1 being the shuttle valve member closed to the inlet-side sealing face 49a). A failure in the second primary spring 44b would have a similar sequence mirrored to the relevant parts of the valve.

Figure 5A:
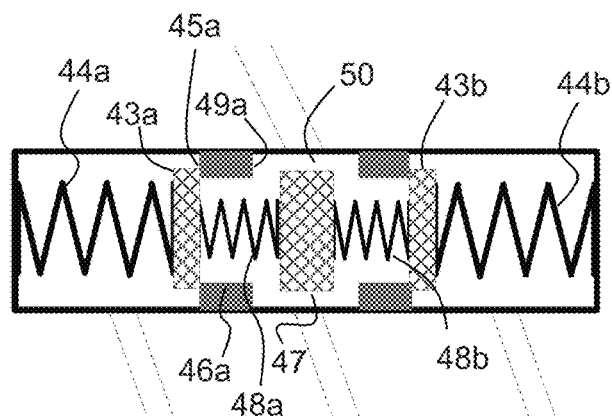
FIGS. 5A-5D shows a sequence of failure accommodation by the mains FSV of FIG. 4 when mains is de-selected and there is a failure in a first primary spring of the mains FSV.

Prior to failure at t0, the mains FSV 39 is configured as shown in FIGS. 4 and 5A with the following system properties:
The resultant force on the first primary valve member 43a is positive to the right since the combination of the PCC and the pressure of the first primary spring 44a acting on the one side of the valve member 43a (left-hand side as illustrated) is greater than the cooling supply pressure acting on the other (right-hand) side of the FSV; but with zero motion as the first primary valve member 43a is retained against the outlet-side sealing face 45a of the first orifice 46a.
The net force on the shuttle valve member 47 is zero as the pressure acting from the cooling fuel supply within the shuttle valve chamber and the force from the balance springs 48a, 48b are equalised.

Figure 5B:
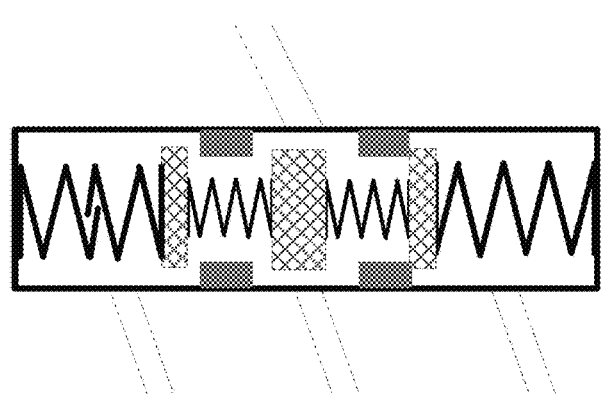
Figure 5C:
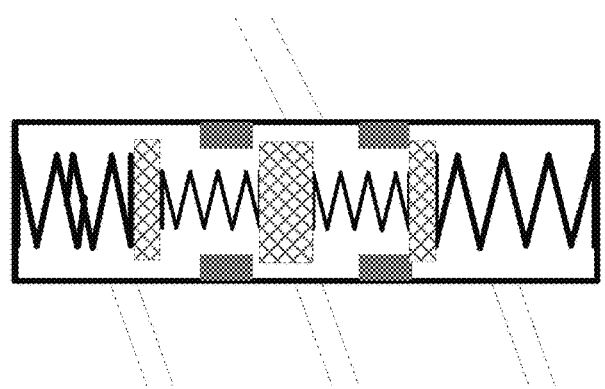

On failure of the first primary spring 44a at time t0, and as shown in FIG. 5B, the following sequence of failure accommodation occurs:
The first primary valve member 43a moves away from the outlet-side sealing face 45a with an acceleration induced by the net pressure differential between PCC, and the combination of cooling supply pressure and forces from the balance springs 48a, 48b. This acceleration reduces as the force available from:
The balance spring compression decays with extension of the springs 48a, 48b.
The pressure between PCC and the cooling supply equalises at approximately PCC.
The shuttle valve member 47 moves towards the inlet-side sealing face 49a of the first orifice 46a due to a net force caused by:
An initial imbalance across the shuttle valve member 47 as the cooling fuel flow "drains" past the first primary valve member 43a, this force balancing out when all of the cooling supply is passing through the failed burner and the pressure in the shuttle valve chamber 50 is approximately equal to PCC (allowing for pressure drop across the burner rose and continued cooling supply). This is indicated as $t_1$ on the timeline diagrams.
A reduction in the balance force from the first balance spring 48a caused by movement in first primary valve member 43a relative to the second balance spring 48b, acting against the second primary valve member 43b which appears fixed relative to the second balance spring 48b.

Figure 5D:
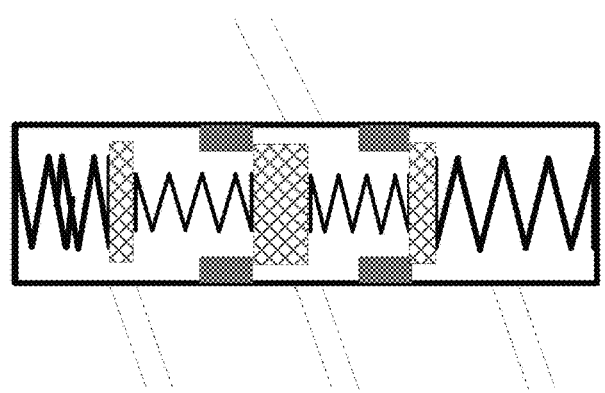
Figure 6A:
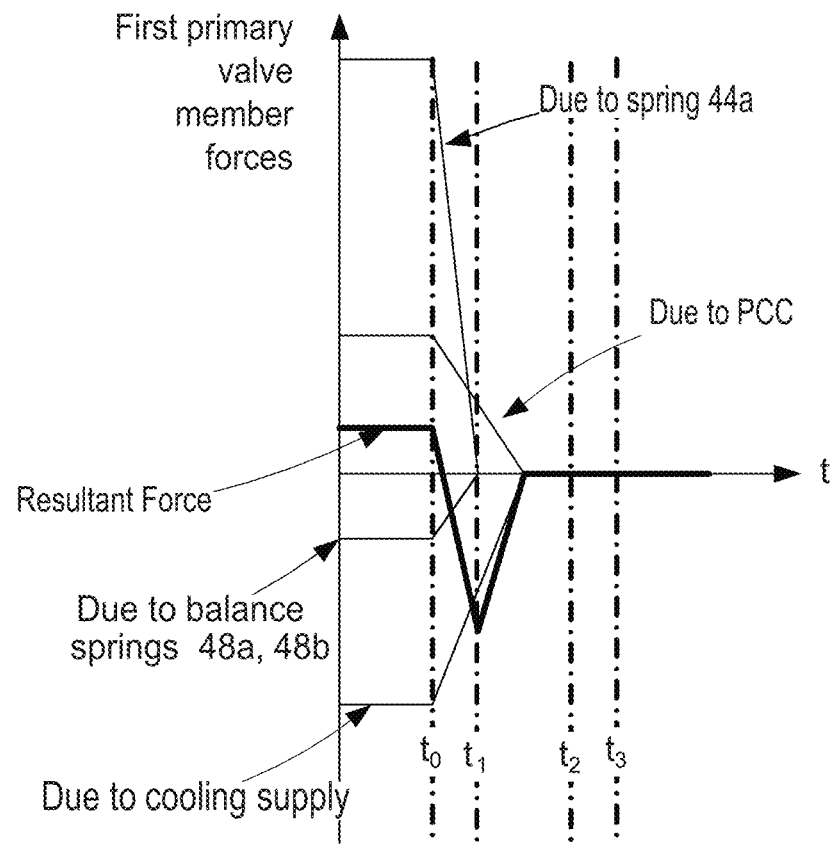
FIGS. 6A-6D show corresponding timeline graphs for respectively first primary valve member forces, shuttle valve member forces, first primary valve member position, and shuttle valve member position.
Figure 6C:
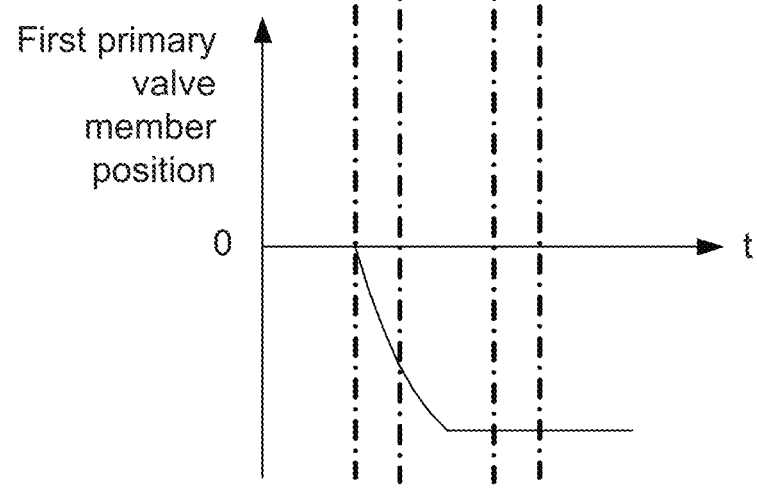
Figure 6B:
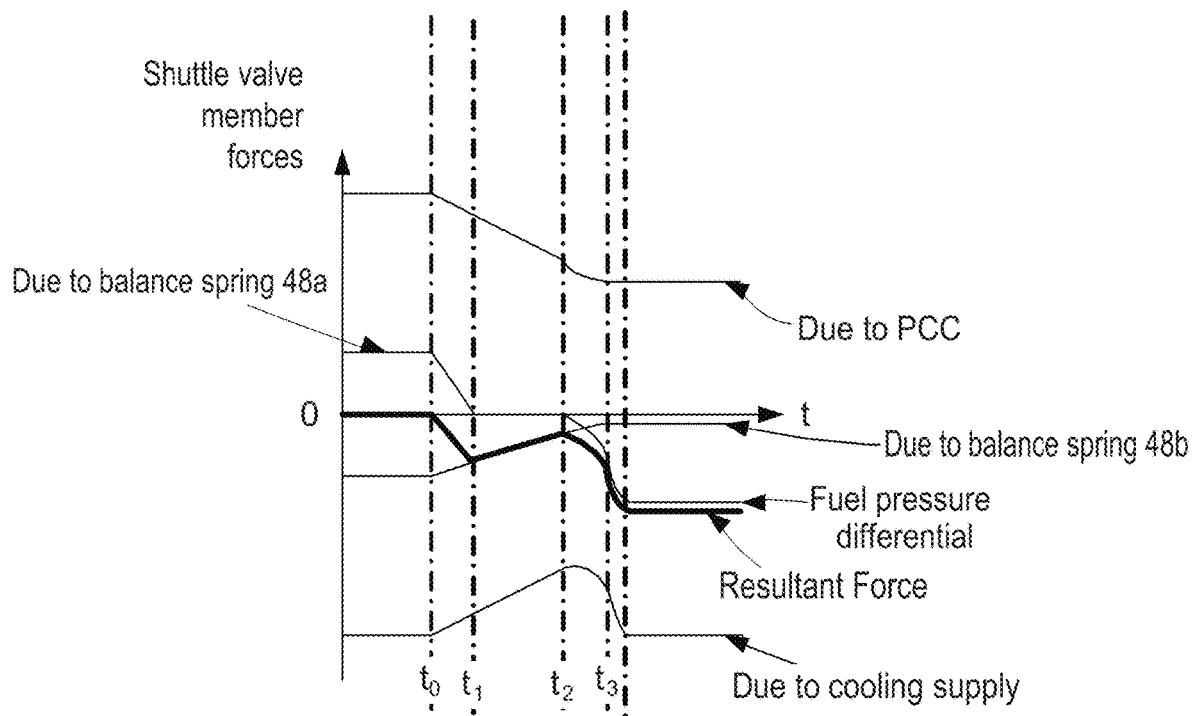
Figure 6D:
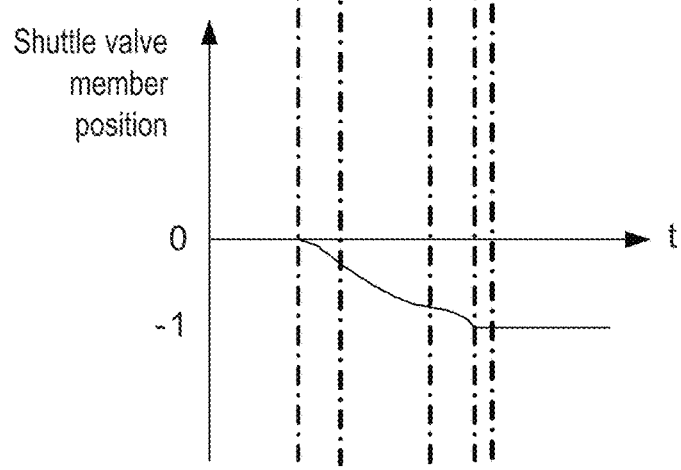

The shuttle valve member 47 continues to be pushed towards the inlet-side sealing face 49a of the first orifice 46a by the second balance spring 48b until time $t_2$ (shown in FIG. 5C) where the shuttle valve nears the inlet-side sealing face 49a and the following force is also instigated:
The proximity of the shuttle valve member 47 to the inlet-side sealing face 49a impacts on the fuel flow through the failed open first primary valve member 43a, causing a pressure drop across the shuttle valve member 47 between PCC and the pressure in the shuttle valve chamber 50. This pressure drop moves the shuttle valve member 47 against the inlet-side sealing face 49a (as shown in FIG. 5D), since the cooling fuel flow increases the shuttle valve chamber pressure acting on the shuttle valve member. Indeed, if the movement of the first primary valve member 43a away from the outlet-side sealing face 45a is enough to completely release the compression loading on the first balance spring 48a, then the force applied by the second balance spring 48b on the shuttle valve member 47 is enough to move the shuttle valve member 47 against the inlet-side sealing face 49a irrespective of the pressure drop across the shuttle valve member.
Once the shuttle valve member 47 has moved against the inlet-side sealing face 49a (i.e. closing off the failed part of the FSV), indicated as $t_3$ in the timing graphs of FIGS. 6A-6D, the differential pressure across the shuttle valve member 47 increases as the cooling fuel flow supply returns the pressure in the shuttle valve chamber 50 to the cooling supply pressure setting, holding the shuttle valve member 47 in position, indicated as $t_4$ in the timing graphs of FIGS. 6A-6D.

Next, FIGS. 7A-7E show the sequence of failure accommodation by the mains FSV 39 when mains is selected and there is a failure in the first primary spring 44a. FIGS. 8A-8D show corresponding timeline graphs for respectively: first primary valve member forces (positive forces directed to the right in FIGS. 7A-7E), shuttle valve member forces (positive forces directed to the right in FIGS. 7A-7E), first primary valve member position (positive positions to the right in FIGS. 7A-7E, with zero being the first primary valve member closed to the outlet-side sealing face 45a), and shuttle valve member position (positive positions to the right in FIGS. 7A-7E, with zero being the central location and −1 being the shuttle valve member closed to the inlet-side sealing face 49a). A failure in the second primary spring 44b would have a similar sequence mirrored to the relevant parts of the valve.

Figure 7A:
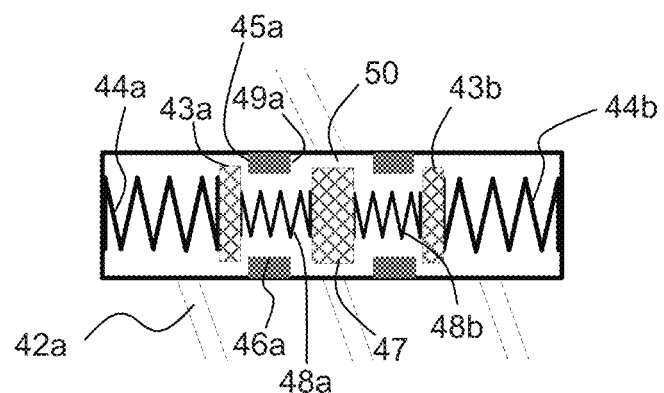
FIGS. 7A-7E show a sequence of failure accommodation by the mains FSV of FIG. 4 when mains is selected and there is a failure in the first primary spring.

Prior to failure at to, the mains FSV 39 is configured as shown in FIGS. 4 and 7A with the following system properties:

The forces acting on the primary valve members 43a, 43b from the fuel flow combined with the force from the shuttle valve balance springs 48a, 48b are equivalent to the combined force of the combustion pressure PCC, the cracking pressure PFSVCP and the additional forces from displacement of the primary springs 44a, 44b.

The shuttle valve member 50 is balanced in a central location as the forces from the balance spring 48a, 48b are equalised.

Figure 7B:
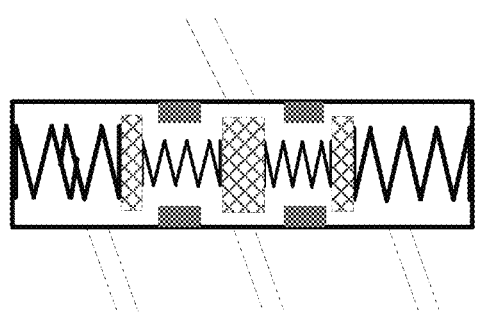
Figure 7C:
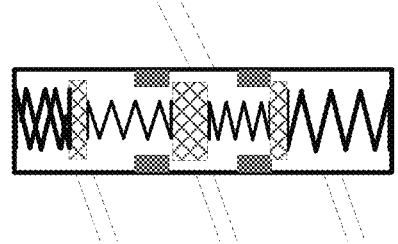

On failure of the first primary spring 44a at time to, the following sequence of failure accommodation occurs:

Immediately after spring failure, the force acting on the first primary valve member 43a from the spring is removed, which causes the pressure differential across the first primary valve member 43a from the mains fuel delivery pressure relative to PCC to act as an impulse force on first primary valve member 43a, opening the flow area through the first orifice 46a, as shown in FIG. 7B.

Increased flow through the burner reduces the pressure in the shuttle valve chamber 50 as the flow rate is not being met by the supply from the mains manifold 36 and due to the existing flow around the second primary valve member 43b and through the other burners. In effect, the metered flow from the mains manifold is constant such that the increased flow through the failed burner leaves less flow to the other burners, which require less pressure to maintain their share of the remaining flow.

The reduction in the pressure in the shuttle valve chamber 50 causes the second primary valve member 43b to move towards its closure position (shown in FIG. 7C), compressing the second balance spring 48b by mechanical movement, and adding an impulse force to the second balance spring 48b as a function of the decompression force of the second primary spring 44b. This is reflected in the graphs of FIG. 8 by the rate of difference in the force reduction of the second balance spring 48b relative to the force reduction of the first balance spring 48a. On the ground at high flow conditions, the second primary valve member 43b may not fully close but will still be in an unequal position relative to the first primary valve member 43a, which means that the second balance spring 48b provides a resultant force for movement of the shuttle valve member 47.

The first balance spring 48a is decompressed by the loss of the first primary spring 44a and the movement of first primary valve member 43a.

The shuttle valve member 47 moves towards the inlet-side sealing face 49a of the first orifice 46a due to the mis-match of balance spring loadings.

Figure 7D:
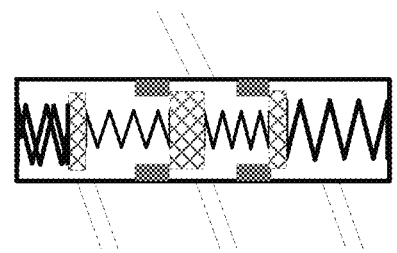

At a certain point, illustrated as $t_2$ in FIG. 8, the flow area between the shuttle valve member 47 and the inlet-side sealing face 49a restricts the flow into the first outlet 42a and its burner and causes a rising differential pressure across the shuttle valve member 47, which acts with the first balance spring 48a to cause the shuttle valve member 47 to close-off the flow, as shown in FIG. 7D.

Figure 7E:
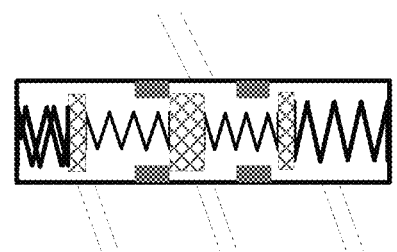

Once the shuttle valve member 47 closes-off the failed part of the FSV 39, the shuttle valve chamber 50 is re-pressurised to the manifold fuel supply pressure, causing the second primary valve member 43b to re-open, as shown in FIG. 7E. The second balance spring 48b may not be fastened to the shuttle valve member 47 so that the shuttle valve member is not pulled away from the inlet-side sealing face 49a of the first orifice 46a by movement of the second primary valve member 43b.

A method of failed-open detection of a mains FSV is described in EPA 3217000. An extension of this method can be applied to the mains FSV 39 described above.

In summary, the extension is to use manifold pressure measurements to detect the following sequences:

Detection with mains de-selected—a failure event can be detected as a transient dip and recovery in fuel manifold pressures as follows:

Before failure, the mains manifold pressure is greater than PCC but less than PCC+PFSVCP.

On failure and during movement of the shuttle valve member, the manifold pressure reduces to approximately PCC. The duration of this pressure reduction is dependent upon the balance spring dynamics. The duration of the closure action may also cause a response in the metered flow on the engine.

Following closure of the FSV flow by the shuttle valve member, the manifold pressure rises back to be greater than PCC but less than PCC+PFSVCP.

Subsequent mains selection can confirm the failure by the change in relative pressures in the manifold for the flow rate through the remaining burners.

Detection with mains selected:

Before failure, the mains manifold pressure is in an expected range based on the metered flow allocated to mains and the pressure required for all FSVs to split the mains allocation.

On failure, the manifold pressure reduces to typically less than PCC+PFSVCP, such that 1 or more other FSVs close. The duration of this pressure reduction is dependent upon the balance spring dynamics and lasts until the shuttle valve member moves to close off the failed part of the FSV.

For scenarios where the manifold pressure reduces to not less than PCC+PFSVCP (identified by the flow capacity of the burner and the overall flow rate for combustion) a transient response still occurs that allows for detection.

Following closure of the failed part of the FSV by the shuttle valve member, the manifold pressure rises back to lie in the range expected for the reduced number of active burners to split the mains allocation (i.e. the pressure in the manifold increases for equivalent steady state conditions allowing for tolerances on the FSVs and the measurement pressure).

The mains FSV 39 may have various further features. For example, as identified above, the balance springs 44a, 44b can be loose (i.e. operably detachable) at one or both ends on their respective points of reaction. This ensures that, on failure when mains is selected, the shuttle valve member 47 is not pulled away from the inlet-side sealing face of the orifice on the failed side of the FSV by the re-opening of the primary valve member on the other side of the FSV (i.e. the balance springs are prevented from going into tension).

However, in this case, preferably the detachable ends of the springs are slidably movable within respective retaining structures formed at the points of reaction. For example, the retaining structures can be recesses formed in the valves members in which the ends are inserted, or projections from the valve members which insert into the ends. In this way, the alignment of the balance springs and the valve members on which they act can be maintained, even when the springs are at zero compression.

As another example, excessive oscillatory movement of the shuttle valve member 47 can be avoided by ensuring that the distance between the sealing surface on one side of the shuttle valve member (i.e. the sealing surface that engages with the inlet-side sealing face of the orifice on that side of the shuttle valve member) and the sealing surface on the corresponding primary valve member (i.e. the sealing surface that engages with the outlet-side sealing face of the same orifice) when the corresponding balance spring is at full compression is greater than the distance between inlet-side and outlet-side sealing faces of the orifice. In this way, the fuel pressure in the shuttle valve chamber 50 has to be exposed to the primary valve member in normal operation. If the balance spring, under full compression, was of a length such that the distance between the sealing surfaces was less than distance between inlet-side and outlet-side sealing faces of the orifice, the restoring force of the other balance spring may not ensure that the shuttle valve member would be appropriately urged to the centre of the shuttle valve chamber 50 when the valve was operating as normal.

A further consideration is for the balance springs 44a, 44b to have a fully compressed load setting that is less than the force available between PCC and the intended cooling flow pressure when mains is de-selected. This ensures that in the event of a jammed primary valve member 43a, 43b, where the balance spring connected to the jammed primary valve member is not at full extension (i.e. unloaded), the differential force acting on the shuttle valve member 47 due to the cooling fuel delivery pressure can exceed the balance spring loading and cover a wider range of jammed position failure cases.

Advantages of the mains FSVs of the present disclosure are:

The FSVs provide a relatively simple pressure flow balancing system that acts in conjunction with individual fuel spray nozzle capacity, along with the combustion chamber pressure, to equalize the fuel spray nozzle exit pressure.

The FSVs can have a relatively simple construction and operation. For example, the operation of the primary springs 44a, 44b is inherently reliable, whilst the loading on the balance springs 48a, 48b can be low such that operation of the shuttle valve member 47 is restricted to a linear range of required responses.

The FSVs do not require tight tolerances in the valve assembly, whereby accurate thermal matching of dissimilar metals in the assembly may not be necessary.

The FSVs allow distinct pressure settings for PFSVCP relative to the loading of the balance springs 48a, 48b, thereby making the FSVs tolerant of fluctuations in pressure or pressure measurement inaccuracies.

Failure of the balancing springs 48a, 48b is detectable on valve opening conditions, e.g. through application of a detection method like that described in described in EP A 3217000.

As the shuttle valve member 47 moves towards a closed position the pressure force created by the burner flow entrainment provides a suction force on the shuttle valve member that acts as an assisting force relative to the balancing spring and fuel supply pressure.

Figure 9A:
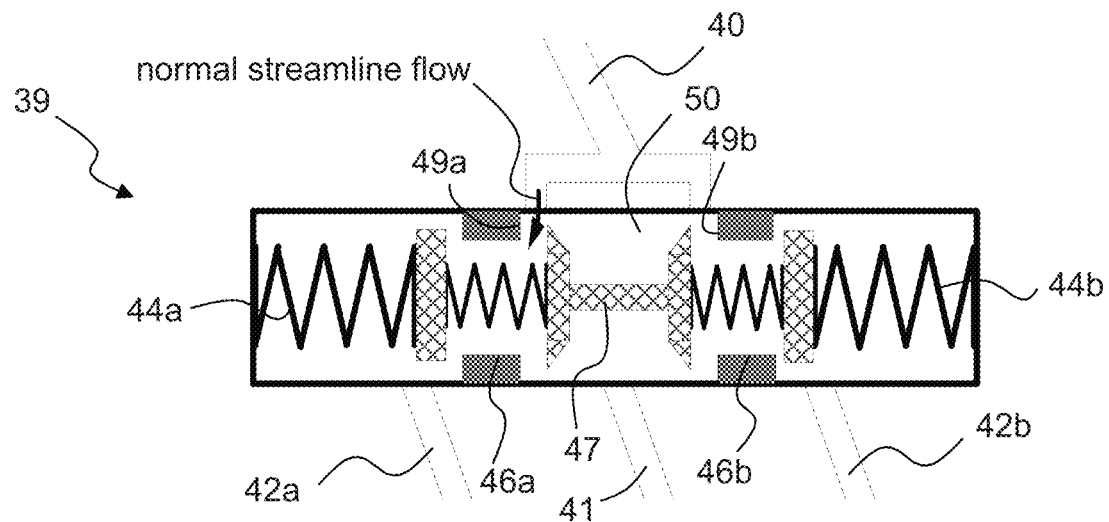
FIGS. 9A and 9B show schematically variant of the mains FSV in which the supply from the mains manifold is split on delivery into the valve, FIG. 9A showing a centrally-located the shuttle valve member and FIG. 9B showing a displaced shuttle valve member.
Figure 9B:
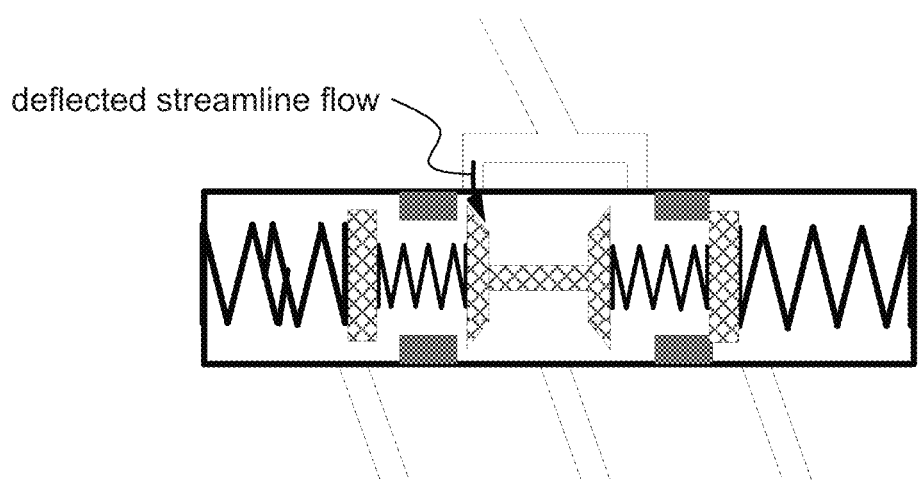
Figure 10:
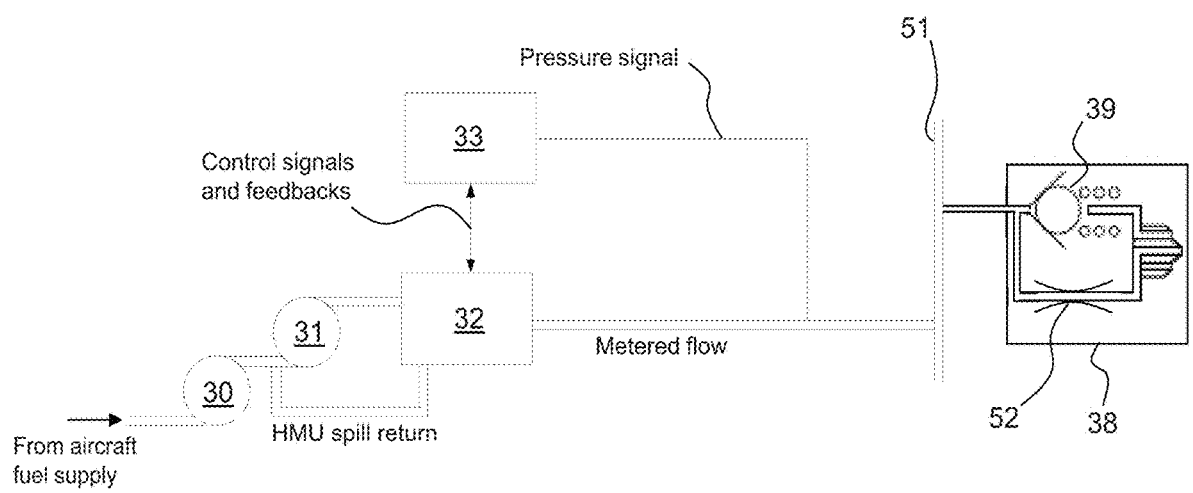
FIG. 10 shows schematically a variant staged combustion fuel supply system.

The FSVs 39 of the present disclosure can also be applied to a single-manifold staged combustion system, shown schematically in FIG. 10. Features which correspond to identical or similar features in the system of FIG. 2 have the same reference numbers in FIG. 10. In the system of FIG. 10 the fuel splitting unit is redundant and metered flow is provided as a single supply through a single manifold 51 to the set of FSVs 39, the basic structure of which can be the same as described above in respect of FIGS. 4 to 9. However, while in the system of FIG. 2, the cooling inlet 41 to the shuttle valve chamber 50 supplied fuel from the cooling manifold 37, in the system of FIG. 2 there is no separate cooling supply and this feature is used instead as a bypass outlet to the pilot lines of the two burners 38 served by the dual valve mains FSV 39. With the single manifold option there are limitations with regards to the fuel split relative to the multi manifold option of FIG. 2. In particular:

The pilot exit flow number from the bypass outlet is effectively fixed (indicated as a fixed orifice 52 in FIG. 10), and thus is sized for maximum flow conditions on ground, where the required pilot mass fuel flow is generally greater than the overall mass fuel flow for cruise conditions. This means that mains may not be selected at cruise.

The fuel flow passes through the pilot lines of the burners by priority until the pilot flow rate is "choked", causing a rise in the pressure within the shuttle valve chamber 50, and thereby effectively forming a fixed point of transition to pilot and mains operation based upon the pilot exit flow number.

The mains inlet 40 and/or the cooling inlet 41 can be advantageously positioned such that the flow of fluid into the valve impinges on an impingement portion of the shuttle valve member 47 when it engages with the inlet-side sealing face 49a, 49b of the orifice 46a, 46b on failure of a primary spring 44a, 44b. In particular, the impingement portion can be shaped such that the impingement of the flow thereon provides an assistive force maintaining engagement of the shuttle valve member with the inlet-side sealing face. This is illustrated in FIGS. 9A and 9B in the context of a variant of the mains FSV 39 in which the supply from the mains manifold 36 (and/or the supply from the cooling supply manifold 37) is split on delivery into the shuttle valve chamber 50, such that the split mains inlet 40 provides a first entry position for a first portion of the mains flow and a second entry position for a second portion of the mains flow. Thus FIG. 9A shows the shuttle valve member centrally located in the shuttle valve chamber 50. In this location of the member 50, the mains flow through the split mains inlet 40 follows normal streamline pathways through the orifices 46a, 46b. However, the shuttle valve member includes respective angled impingement surfaces for the mains flow to act on, as illustrated in FIG. 9B, when the shuttle valve member is displaced from the central location to engage with the inlet-side sealing face 49a, 49b of the respective orifice 46a, 46b on failure of a primary spring 44a, 44b. In particular, the respective impingement portion deflects the corresponding portion of the split mains flow to provide an assistive force maintaining engagement of the shuttle valve member with the respective inlet-side sealing face.

The functionality described above in respect of a linearly opposed dual valve that supplies fuel to two adjacent burners can also be achieved with a mains FSV that supplies fuel to just one burner. Such a valve 39 is shown schematically in FIG. 11. Features which correspond to identical or similar features in the valve of FIG. 4 have the same reference numbers in FIG. 11.

Figure 11:
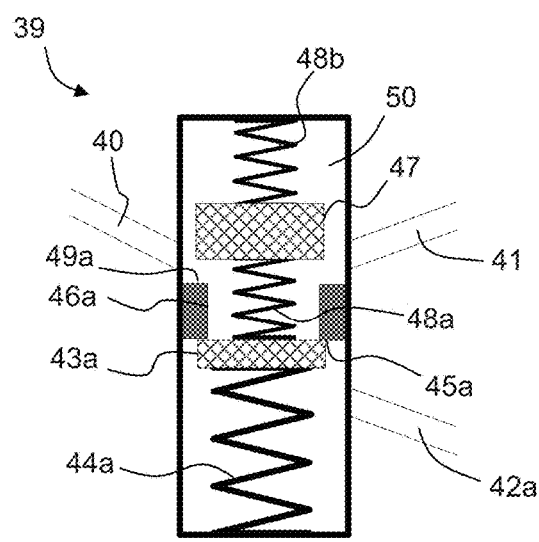
FIG. 11 shows schematically a mains single FSV.

In the valve of FIG. 11, the shuttle valve member 47 is still acted upon by first 48a and second 48b balance springs. However, while the first balance spring 48a acts between the shuttle valve member and the primary valve member 43a, the second balance spring 48b acts between the shuttle valve member and a wall of the shuttle valve chamber 50. In normal operation, the single primary valve member 43a draws the shuttle valve member 47 towards the inlet-side sealing face 49a of the orifice 46a, such that the shuttle valve member does not remain at a single location (i.e. independent of a failure case). However, the valve can be configured so that this normal movement of the shuttle valve member does not affect flow through the orifice 46a.

Although described above in relation to a mains FSV, the fault-accommodating flow scheduling valve can also be applied to other fluid systems where there is a need to split a common flow into two flow paths, and where a fault may cause an increase in flow through one path and a decrease in flow through the other path. For example, such a fault is not limited to a failed valve spring but could be a pipe fracture which removes back pressure on the valve, thereby causing an excessive differential pressure and increased flow number. Continued fluid flow through either of the flow paths may then be needed for mission operation. For example, in a cooling system, a fault in one flow path could drain the coolant from the other flow path, which could result in a system overheat condition.

The fault-accommodating flow scheduling valve may have particular utility in high temperature environments in which electronic control or tight valve tolerances cannot be maintained due to a high thermal differential between the operating fluid and the external environment.

The fault-accommodating flow scheduling valve may also have utility in the oil system for a power gearbox. In such a gearbox, the oil supply may have to be split to provide enhanced cooling of the gearbox. If a residual minimum flow to the gearbox is required, this may be provided by a suitable hole in the shuttle valve member, or other restricted bypass mechanism associated with the operation of the shuttle valve member.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

All references referred to above are hereby incorporated by reference.

What is claimed is:

1. A fault-accommodating flow scheduling valve having:
a first inlet for flow of fluid into the valve, an outlet for flow of fluid out of the valve, and an orifice therebetween;
a shuttle valve member on the inlet-side of the orifice and configured to seal the outlet from the first inlet when the shuttle valve member engages with an inlet-side sealing face of the orifice;
a primary valve member on the outlet-side of the orifice and configured to seal the outlet from the first inlet when the primary valve member engages with an outlet-side sealing face of the orifice;
a compression-loaded primary spring which acts on the primary valve member to urge the primary valve member into engagement with the outlet-side sealing face;
first and second compression-loaded balance springs which act on the shuttle valve member, the first balance spring acting between a first side of the shuttle valve member and the primary valve member, and the second balance spring acting on an opposite, second side of shuttle valve member;
wherein the primary and balance springs are configured such that, below a threshold differential pressure across the primary valve member: (i) in normal operation of the flow scheduling valve, the primary valve member engages with the outlet-side sealing face to close the valve while the shuttle valve member is spaced from the inlet-side sealing face, and (ii) on failure of the primary spring, the primary valve member moves away from the outlet-side sealing face but the shuttle valve member engages with the inlet-side sealing face to close the valve; and
wherein the primary and balance springs are further configured such that, above the threshold differential pressure across the primary valve member: (i) in normal operation of the flow scheduling valve, the primary valve member moves away from the outlet-side sealing face to open the valve while the shuttle valve member remains spaced from the inlet-side sealing face, and (ii) on failure of the primary spring, the primary valve member moves further away from the outlet-side sealing face but the shuttle valve member engages with the inlet-side sealing face to close the valve.

2. The fault-accommodating flow scheduling valve according to claim 1, wherein the first balance spring extends through the orifice to act between the first side of the shuttle valve member and the primary valve member.

3. The fault-accommodating flow scheduling valve according to claim 1, wherein each balance spring acts at opposite ends thereof on respective points of reaction, either or both of the ends of each balance spring being operably detachable from of their respective points of reaction if the compression loading of that balance spring is removed.

4. The fault-accommodating flow scheduling valve according to claim 3, wherein the, or each, point of reaction from which that balance spring end is operably detachable has an associated retaining structure along which the detached end is slidably movable if the compression loading of that balance spring is removed, thereby maintaining alignment of the detached end and its point of reaction.

5. The fault-accommodating flow scheduling valve according to claim 1, wherein the shuttle valve member has a sealing surface which engages with the inlet-side sealing face, and the primary valve member has a sealing surface which engages with the outlet-side sealing face, the distance between the sealing surfaces of the shuttle valve member and the primary valve member when the first balance spring is fully compressed being greater than the distance between the outlet-side sealing face and the inlet-side sealing face.

6. The fault-accommodating flow scheduling valve according to claim 1, wherein the first inlet is positioned such that the flow of fluid into the valve impinges on an impingement portion of the shuttle valve member when it engages with the inlet-side sealing face of the orifice on failure of the primary spring, the impingement portion being shaped such that the impingement of the flow thereon provides an assistive force maintaining engagement of the shuttle valve member with the inlet-side sealing face.

7. The fault-accommodating flow scheduling valve according to claim 1, which is a dual valve having first and second of the outlets, first and second of the orifices, first and second of the primary valve members, and first and second of the primary springs respectively acting on the first and second primary valve members, wherein:
  the first orifice is between the first inlet and the first outlet, the first primary valve member being on the first outlet-side of the first orifice;
  the second orifice is between the first inlet and the second outlet, the second primary valve member being on the second outlet-side of the second orifice;
  the shuttle valve member is located between the first and second orifices; and
  the first balance spring acts between the first side of the shuttle valve member and the first primary valve member, and the second balance spring acts between the second side of the shuttle valve member and the second primary valve member.

8. The fault-accommodating flow scheduling valve according to claim 7, wherein, in normal operation and for pressures across the primary valve members both below and above the threshold differential pressure, the balance springs maintain the shuttle valve member midway between the orifices.

9. The fault-accommodating flow scheduling valve according to claim 7, wherein the first inlet is a split inlet providing a first entry position for a first portion of the flow of fluid into the valve and a second entry position for a second portion of the flow of fluid into the valve, the first entry position being positioned such that the first portion of flow impinges on a first impingement portion of the shuttle valve member when it engages with the inlet-side sealing face of the first orifice on failure of the first primary spring, and the second entry position being positioned such that the second portion of flow impinges on a second impingement portion of the shuttle valve member when it engages with the inlet-side sealing face of the second orifice on failure of the second primary spring, each impingement portion being shaped such that the impingement of the respective flow portion thereon provides an assistive force maintaining engagement of the shuttle valve member with the respective inlet-side sealing face.

10. The fault-accommodating flow scheduling valve according to claim 1, wherein the second balance spring acts between a fixed anchor point and the second side of shuttle valve member.

11. The fault-accommodating flow scheduling valve according to claim 10, wherein, in normal operation and for pressures across the primary valve member both below and above the threshold differential pressure, the balance springs maintain the shuttle valve member at distances from the inlet-side sealing face such that the shuttle valve member does not restrict fluid flow through the orifice.

12. The fault-accommodating flow scheduling valve according to claim 1, further having a second inlet for flow of fluid into the valve, the second inlet being on the same side of the orifice as the first inlet, whereby:
  when the differential pressure across the primary valve member is above the threshold differential pressure such that the valve is open, the flow of fluid into the valve is through the first inlet and optionally the second inlet; and
  when the differential pressure across the primary valve member is below the threshold differential pressure such that the valve is closed, a circulating flow of fluid enters the valve through the second inlet and leaves the valve through the first inlet.

13. A fuel supply system of a gas turbine engine having a fuel supply manifold, plural burners of a combustor of the engine, and plural of the fault-accommodating flow scheduling valves according to claim 1, the fuel supply manifold supplying fuel to the first inlets of the flow scheduling valves, and the outlets of the flow scheduling valves supplying fuel to the burners, wherein the flow scheduling valves control fuel flow from the manifold to the burners.

14. The fuel supply system according to claim 13 wherein the fuel supply manifold is a mains fuel supply manifold which supplies a mains fuel flow to the burners, the fuel supply system further has a pilot fuel supply manifold which supplies a pilot fuel flow to the burners, the fuel supply system has a pilot-only operation mode in which just the pilot fuel flow is supplied to the burners, and the fuel supply system has a pilot and mains operation mode in which both the pilot fuel flow and the mains fuel flow are supplied to the burners;
  wherein, in the pilot-only operation mode, the pressure in the mains fuel supply manifold causes the differential pressure across the primary valve members to be below the threshold differential pressure to close the valves, and, in the pilot and mains operation mode, the pressure in the mains fuel supply manifold causes the differential pressure across the primary valve members to be above the threshold differential pressure to open the valves.

15. The fuel supply system according to claim 14, wherein each fault-accommodating flow scheduling valve further has a second inlet for flow of fluid into the valve, the second inlet being on the same side of the orifice as the first inlet, whereby: when the differential pressure across the primary valve member is above the threshold differential pressure such that the valve is open, the flow of fluid into the valve is through the first inlet and optionally the second inlet; and when the differential pressure across the, or each, primary valve member is below the threshold differential pressure such that the valve is closed, a circulating flow of fluid enters the valve through the second inlet and leaves the valve through the first inlet; and
  wherein the fuel supply system further has a cooling supply manifold which supplies a cooling fuel flow to the second inlets of the flow scheduling valves during pilot-only operation, whereby:
  when the differential pressure across the primary valve member is above the threshold differential pressure such that the valve is open, the flow of fluid into the valve is through the first inlet from the mains fuel supply manifold and optionally through the second inlet from the cooling supply manifold; and
  when the differential pressure across the primary valve member is below the threshold differential pressure such that the valve is closed, a circulating flow of fluid enters the valve through the second inlet from the cooling supply manifold and leaves the valve through the first inlet to the mains fuel supply manifold, or vice versa.

16. A gas turbine engine having the fuel supply system according to claim 13.

17. An oil supply system of a power gearbox having an oil supply line and the fault-accommodating flow scheduling valve according to claim 1.

18. A power gearbox having the oil supply system according to claim 17.

* * * * *